United States Patent
Harris

(10) Patent No.: US 9,618,106 B2
(45) Date of Patent: Apr. 11, 2017

(54) AUTOMOBILE DIFFERENTIAL LOCKING ASSEMBLY

(71) Applicant: Bobby Harris, Orange, TX (US)

(72) Inventor: Bobby Harris, Orange, TX (US)

( * ) Notice: Subject to any disclaimer, the term of this patent is extended or adjusted under 35 U.S.C. 154(b) by 296 days.

(21) Appl. No.: 14/476,691

(22) Filed: Sep. 3, 2014

(65) Prior Publication Data

US 2015/0176688 A1 Jun. 25, 2015

Related U.S. Application Data

(60) Provisional application No. 61/873,059, filed on Sep. 3, 2013.

(51) Int. Cl.
*F16H 48/20* (2012.01)
*F16H 48/30* (2012.01)

(52) U.S. Cl.
CPC ....... *F16H 48/20* (2013.01); *F16H 2048/305* (2013.01); *Y10T 74/19647* (2015.01)

(58) Field of Classification Search
CPC .......................... F16H 48/20; F16H 2048/305
USPC .................................. 74/650; 301/127.1–137
See application file for complete search history.

(56) References Cited

U.S. PATENT DOCUMENTS

| | | | | | |
|---|---|---|---|---|---|
| 1,691,230 | A | * | 11/1928 | Dennison | F16H 48/10 475/250 |
| 3,862,672 | A | * | 1/1975 | Tappen | F16H 57/021 184/6.12 |
| 4,169,394 | A | * | 10/1979 | Estrada | F16H 48/08 475/234 |
| 6,386,565 | B1 | * | 5/2002 | Kugler | B60G 7/003 280/124.165 |

OTHER PUBLICATIONS

"Richmond Mini Spools", JEGS Apparel and Accessories, Nov. 23, 2009, https://web.archive.org/web/20091123234028/http://www.jegs.com/i/Richmond-Gear/836/78/7526-1/10002/-1.*

* cited by examiner

*Primary Examiner* — William Kelleher
*Assistant Examiner* — Gregory Prather
(74) *Attorney, Agent, or Firm* — Global Intellectual Property Agency, LLC; Daniel Boudwin

(57) ABSTRACT

An assembly adapted to replace an automobile differential's spider gears, locking the axles together. The present invention comprises a pair of outer drive flange members that are adapted to engage with a pair of wedge locking members within the carrier of an automobile differential, replacing the differential's stock planetary or spider gears. The present assembly locks the rotation of the rear axles together, applying power equally to both wheels and enhancing the performance of the automobile during competitive drag racing events, without requiring expensive custom installation from a specialist.

5 Claims, 6 Drawing Sheets

AUTOMOBILE DIFFERENTIAL LOCKING ASSEMBLY

CROSS REFERENCE TO RELATED APPLICATION

This application claims the benefit of U.S. Provisional Application No. 61/873,059 filed on Sep. 3, 2013. The above identified patent application is herein incorporated by reference in its entirety to provide continuity of disclosure.

BACKGROUND OF THE INVENTION

Field of the Invention

The present invention relates to automobile conversion kits. More specifically, the present invention relates to automobile conversion kits adapted to alter the performance or characteristics of a differential or entirely convert the differential.

Differentials, such as open differentials and limited slip differentials, were designed to allow an automobile's rear wheels to rotate at different speeds when turning, providing improved performance for the automobile during daily driving. However, turning is not a concern for dedicated drag racing enthusiasts because drag races take place on completely straight tracks. Furthermore, the complex mechanical gear systems for differentials have a high failure rate when drag racing due to the large amount of force exerted on the rear axles of the automobiles during the initial acceleration phase at the start of the race. The more complex the mechanical system is, the more parts that can potentially break and result in a failure of the rear axle assembly. Therefore, simple mechanical systems for the rear axle or axles that force both wheels to rotate at the same rate are highly desirable for drag racing enthusiasts.

Description of the Prior Art

Devices and methods have been disclosed in the prior art that relate to converting differentials for drag racing purposes. One such method includes welding an automobile differential's spider gears together, thereby locking the rear axles together. This method is generally highly effective, but it has two main issues. First, if an individual is not familiar with welding techniques, then he or she risks completely ruining the differential and the rear axles. Welding the differential's spider gears requires precise knowledge of the points at which the spider gears need to be welded together and how to avoid causing damage to the spider gears, compromising the structural integrity of the welded differential. If the structural integrity of the welded differential is compromised, then it can potentially snap the axles or even explode in extreme circumstances when drag racing, causing a substantial amount of damage to the individual's automobile. If an individual chooses to hire a specialist to weld the differential spider gears together, then he or she generally has to spend a substantial amount of money because it is a very niche task. Second, welding is a permanent solution that makes it impossible for the individual to convert the automobile back to a conventional differential as needed for daily driving. Therefore, there is a need in the prior art for an assembly that is adapted to replace an automobile's differential in order to lock the rear axles together that is simple to utilize and non-permanent.

SUMMARY OF THE INVENTION

In view of the foregoing disadvantages inherent in the known types of methods or devices that are adapted lock the axles of an automobile having a differential together now present in the prior art, the present invention provides a new automobile differential locking assembly wherein the same can be utilized for providing convenience for the user when converting their automobile for drag racing.

It is therefore an object of the present invention to provide a new and improved automobile differential locking assembly that has all of the advantages of the prior art and none of the disadvantages.

It is another object of the present invention to provide an automobile differential locking assembly that is adapted to replace the stock spider gears of an automobile differential and that fits within a stock differential carrier.

Another object of the present invention is to provide an automobile differential locking assembly that is simple to assemble and install.

Yet another object of the present invention is to provide an automobile differential locking assembly that increases the durability of a conventional automobile's rear axle assembly in order to improve failure rates when drag racing.

Yet another object of the present invention is to provide an automobile differential locking assembly improves performance in competitive drag racing.

Still yet another object of the present invention is to provide an automobile differential locking assembly that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
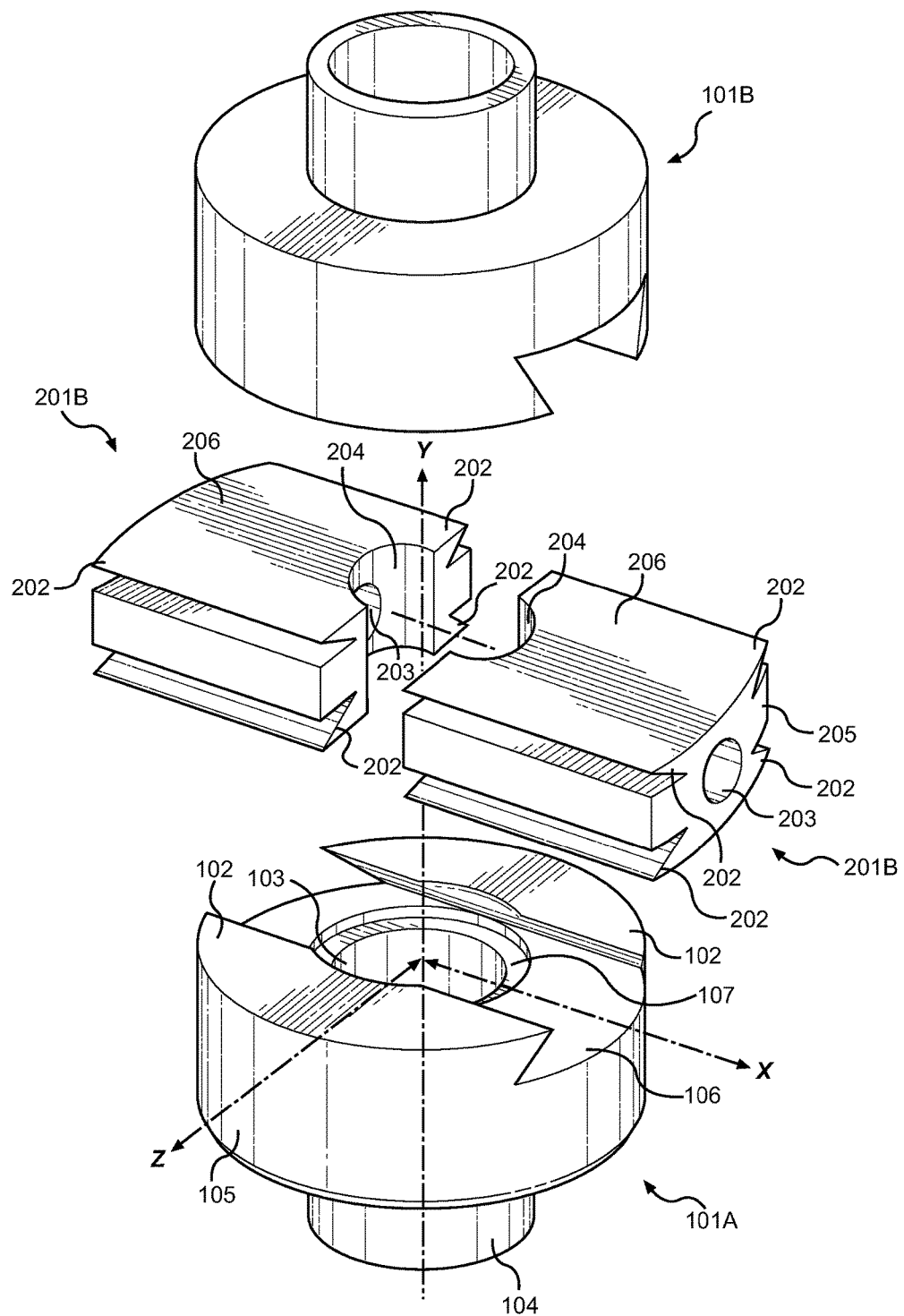
FIG. 1 shows an exploded view of the present invention.

Reference is made herein to the attached drawings. Like reference numerals are used throughout the drawings to depict like or similar elements of the rear axle locking assembly. For the purposes of presenting a brief and clear description of the present invention, the preferred embodiment will be discussed as used for converting an automobile rear axle having a differential into a rigid axle. The figures are intended for representative purposes only and should not be considered to be limiting in any respect.

Referring now to FIG. 1, there is shown an exploded view of the present invention. The present invention comprises a pair of axle-receiving outer drive flanges 101A, 101B that are adapted to engage with a pair of wedge lock members 201A, 201B within the carrier of an automobile differential, replacing the differential's stock planetary or spider gears. The present assembly locks the rotation of the rear axles together, applying power equally to both wheels and enhancing the performance of the automobile during competitive drag racing events, without requiring expensive custom installation from a specialist. Due to the reduction in the complexity of the connection between the automobile's rear axles, the present invention also decreases the failure rate of the rear axles when drag racing.

The present invention comprises four components: a pair of outer drive flanges 101A, 101B that receive the proximal ends of the rear axles and a pair of wedge locks 201A, 201B that lock the outer drive flanges 101A, 101B in place, thereby causing the rear axles to be locked together in a co-rotational relationship. In the depicted embodiment of the present assembly, each of the pairs of outer drive flanges 101A, 101B and wedge locks 201A, 201B are identical in size, shape, and design; however, differently sized pairs of outer drive flanges 101A, 101B and wedge locks 201A, 201B may be provided in order to accommodate different models of differential carriers. Each of the wedge locks 201A, 201B comprises a plurality of lock splines 202 that engage with complementary flange splines 102 disposed on the outer drive flanges 101A, 101B in order to hold the four components of the present invention flush against each other. In one embodiment of the present invention, the recesses between the flange splines 102 and the flange interior surfaces 106 define grooves that are substantially equal to the size of the lock splines 202 to provide fitment between the corresponding portions of the components. The fit between the grooves defined by the flange splines 102 and the lock splines 202 ensures that the assembly is securely held together and that that automobile's rear axles are not permitting to rotate independently within the present assembly.

Figure 2A:
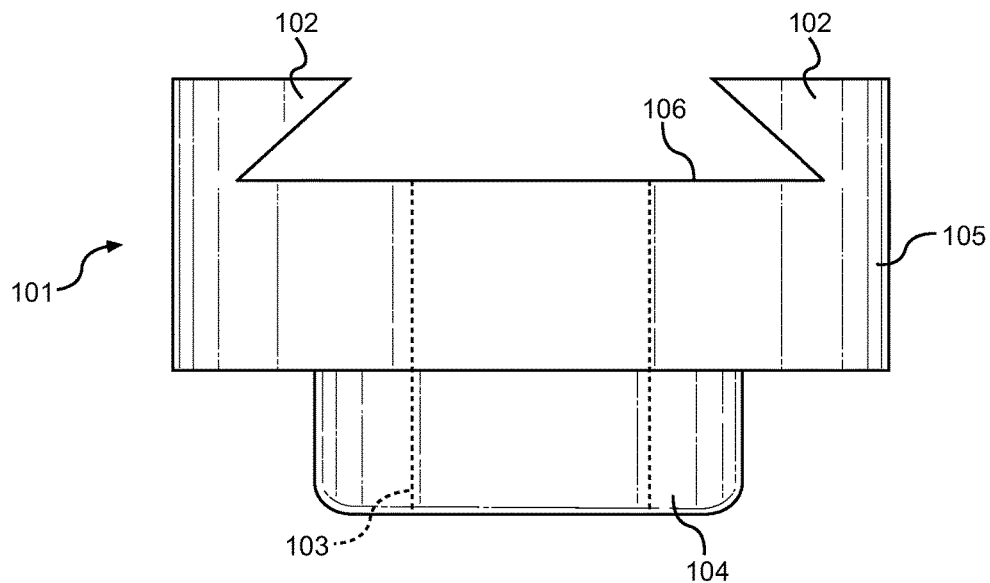
FIG. 2A shows a view of an outer drive flange along the x-axis.
Figure 2B:
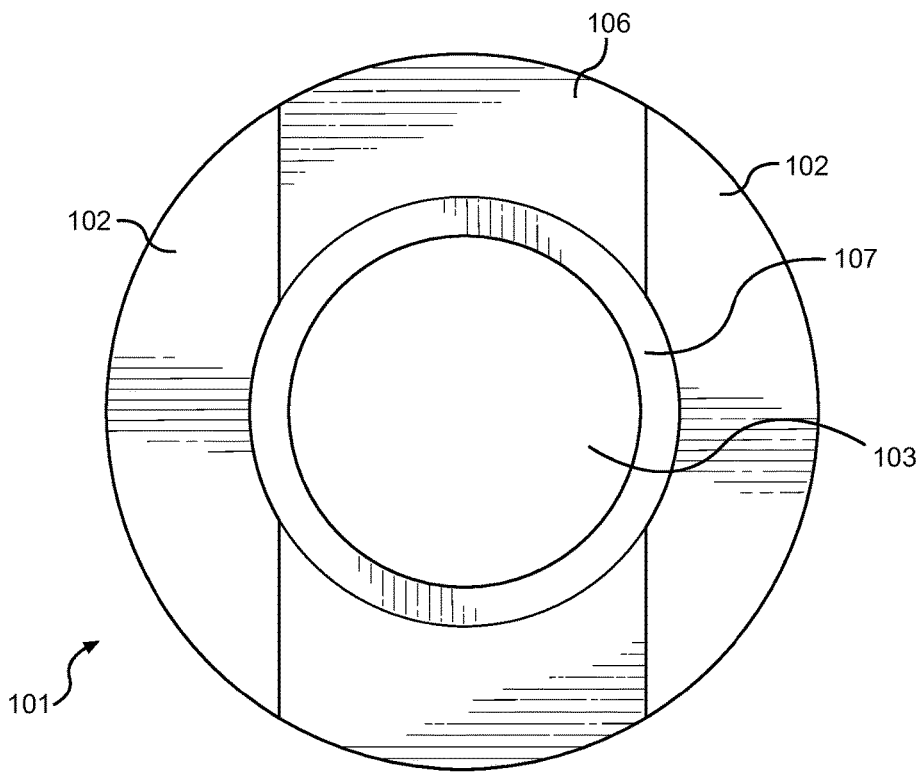
FIG. 2B shows a view of the interior portion an outer drive along the y-axis.

Referring now to FIGS. 2A and 2B, there are shown a view of an outer drive flange along the x-axis and a view of the interior portion an outer drive along the y-axis. The outer drive flanges 101 comprise a substantially cylindrical body 15 having a proximal side and a lateral side. A substantially cylindrical neck 104 extends from the lateral side of the outer drive flanges 101. The proximal side of the outer drive flanges 101 comprises a substantially planar interior surface 106 and a pair of semi-circular flange splines 102 extending from the edges of the outer drive flange interior surface 106. The flange splines 102 have a tapered bottom portion at which they are connected to the outer drive flange interior surface 106 and a wider top portion terminating at a point. The recess between the outer drive flange interior surface 106 and the flange splines 102 defines grooves that are adapted to conform to the size and shape of the complimentary wedge lock splines 202. The opposing flange splines 102 thereby create a channel extending across the outer drive flange interior surface 106 through which the wedge lock splines 202 may be slid, holding the wedge locks 201 securely in place via fitment between the wedge lock splines 202 and the outer drive flange splines 102.

The outer drive flanges 101 further comprise an axle channel 103 extending through the neck 104 and the body 105. The axle channels 103 are adapted to accept the proximal ends of an automobile's rear axles therethrough, which normally are engaged with the spider or planetary gears of a stock differential. Instead, the proximal ends of the rear axles are placed through the axle channels 103 and then locked in place within the present assembly via C-clips or other such retainers, which are preferably retained by the user when the stock spider gears are removed. The C-clips rest within a recessed ledge 107 extending around the perimeter of the end of the axle channel 103 disposed on the outer drive flange interior surface 106. By being adapted to re-use the automobile's stock C-clips, the present assembly is able to reduce the number of additional components that are necessary to convert the automobile's differential and ensure proper engagement between the rear axles and the C-clips. The midpoint of the flange splines 102 comprise an indent corresponding to the shape of the axle channel 103 disposed therebelow. The indents ensure that the axle channel 103 is completely unobstructed, allowing the rear axles to pass therethrough without being impinged upon or blocked by the flange splines 102.

Figure 3A:
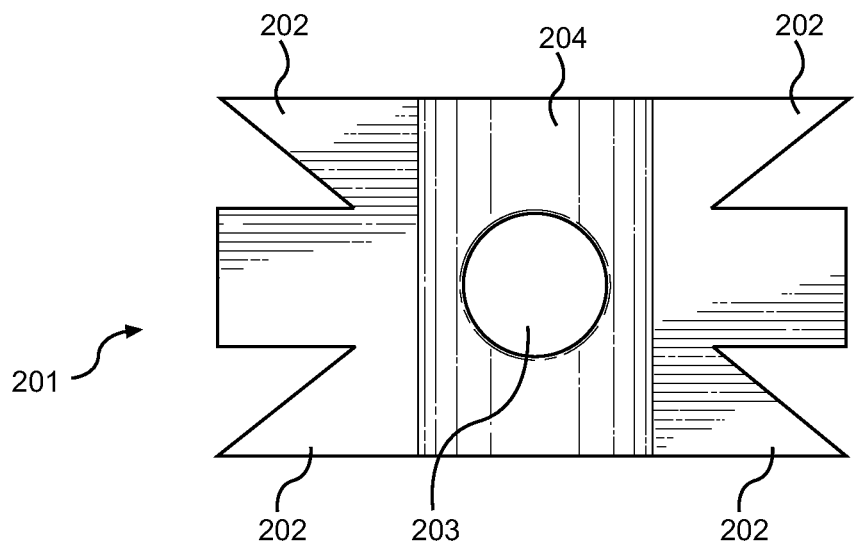
FIG. 3A shows a view of the interior surface of a wedge lock along the x-axis.
Figure 3B:
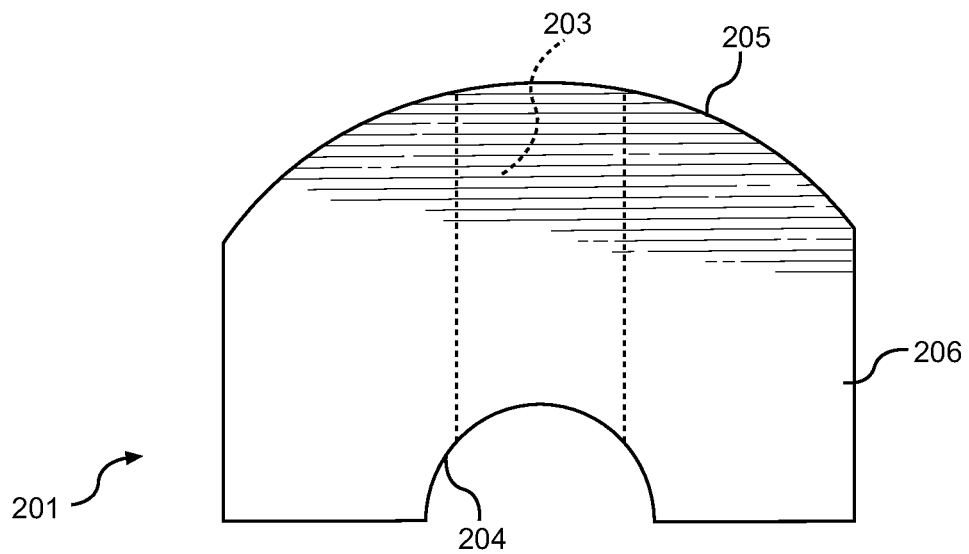
FIG. 3B shows a view of a wedge lock along the y-axis.

Referring now to FIGS. 3A and 3B, there are shown a view of the interior surface of a wedge lock along the x-axis and a view of a wedge lock along the y-axis. The wedge locks 201 comprise a pair of top and bottom planar surfaces 206, a curved wedge lock exterior surface 205, a wedge lock interior surface 204, and a plurality of wedge lock splines 202 extending laterally therefrom. The planar surfaces 206 are adapted to rest flush against the outer drive flange interior surfaces 106 when the components of the present assembly are secured together. The wedge lock interior surface 204 comprises a semi-circular cutout portion flanked by a pair of planar ends, which are adapted to rest against the complimentary planar ends of the opposing wedge lock 201. When the wedge locks 201 are secured within the outer drive flanges 101 the semi-circular cutout regions of the wedge lock interior surface 204 are aligned with the axle channels 103 of the outer drive flanges 101 to form a single, contiguous channel extending longitudinally through the assembly.

The wedge locks 201 further comprises a pin channel 203 extending therethrough. The pin channel 203 is adapted to accept a stock locking pin or a stock differential stud therethrough, which is adapted to hold the spider gears in place with an unmodified differential. When the wedge locks 201A, 201B are secured to the outer drive flanges 101A, 101B within the assembly, the pin channels 203 form a contiguous channel extending through the assembly, perpendicular to the axle channels 103. When a locking pin is inserted through the contiguous, aligned pin channels 203, it locks the wedge locks 201A, 201B in place and prevents them from shifting within the assembly. When the wedge locks 201A, 201B are locked in place, the fitment engagement between the wedge lock splines 202 and the complimentary grooves defined by the outer drive flange splines 102 holds the outer drive flanges 101A, 101B securely in place within the assembly. The rear axles, which are securely held via the outer drive flanges 101A, 101B are then locked in place due to the inability of the outer drive flanges 101A, 101B to rotate within the carrier. Therefore, the rotation of the axles is driven solely by the rotation of the drive or ring gear.

Figure 4A:
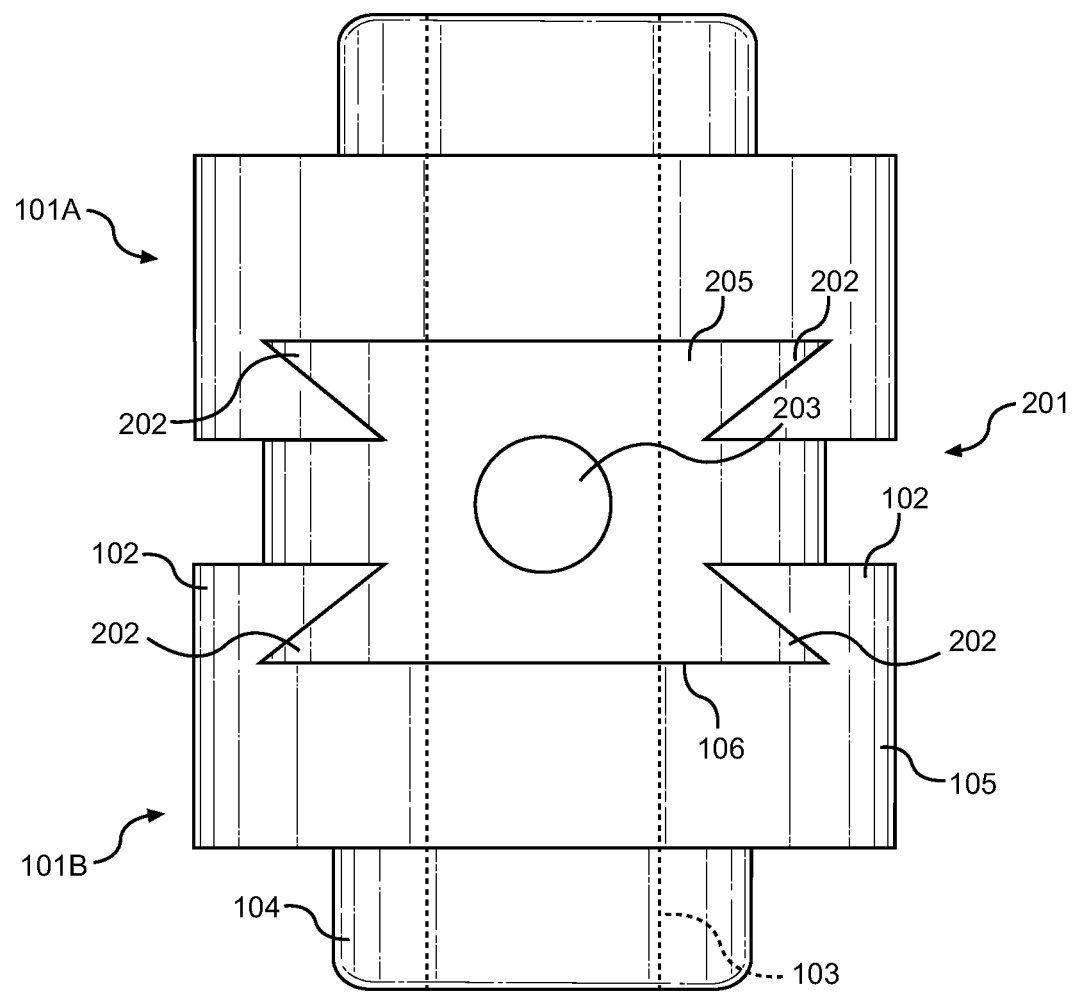
FIG. 4A shows a view of the exterior surface of the components of the present assembly engaged together along the x-axis.
Figure 4B:
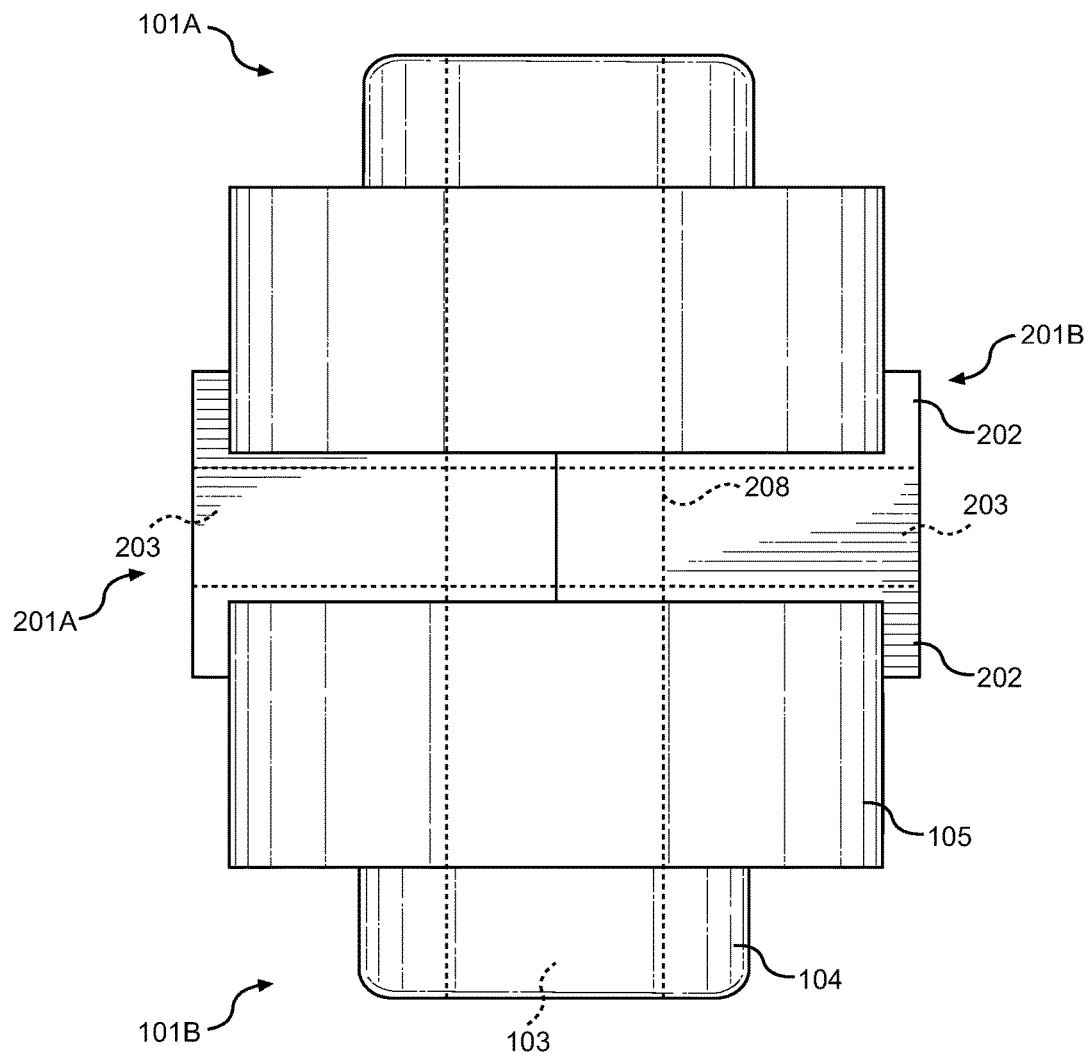
FIG. 4B shows a view of the exterior surface of the components of the present assembly engaged together along the z-axis.
Figure 4C:
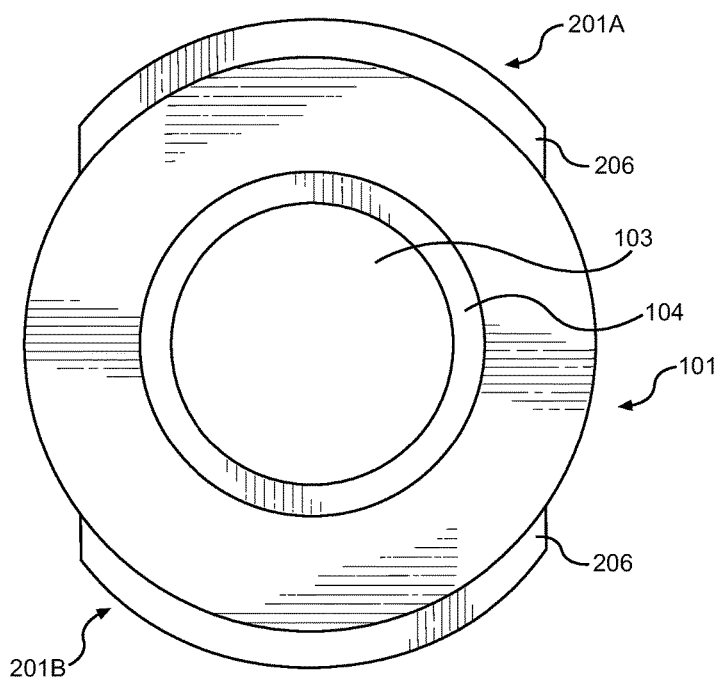
FIG. 4C shows a view of the exterior surface of the components of the present assembly engaged together along the y-axis.

Referring now to FIGS. 4A, 4B, and 4C, there are shown a view of the exterior surface of the components of the present assembly engaged together along the x-axis, a view of the exterior surface of the components of the present assembly engaged together along the z-axis, and a view of the exterior surface of the components of the present assembly engaged together along the y-axis. When secured together, the outer drive flanges 101A, 101B and the wedge locks 201A, 201B are arranged such that the channels 203, 208, 103 therethrough form aligned, contiguous channels. The rear axle channels 103 through the outer drive flanges 101A, 101B are aligned with a secondary interior channel 208 formed by the engagement between the cutout regions along the interior surfaces 204 of the wedge locks 201A, 201B. The pin channel 203 through the wedge locks 201A, 201B are arranged perpendicularly thereto.

Figure 5:
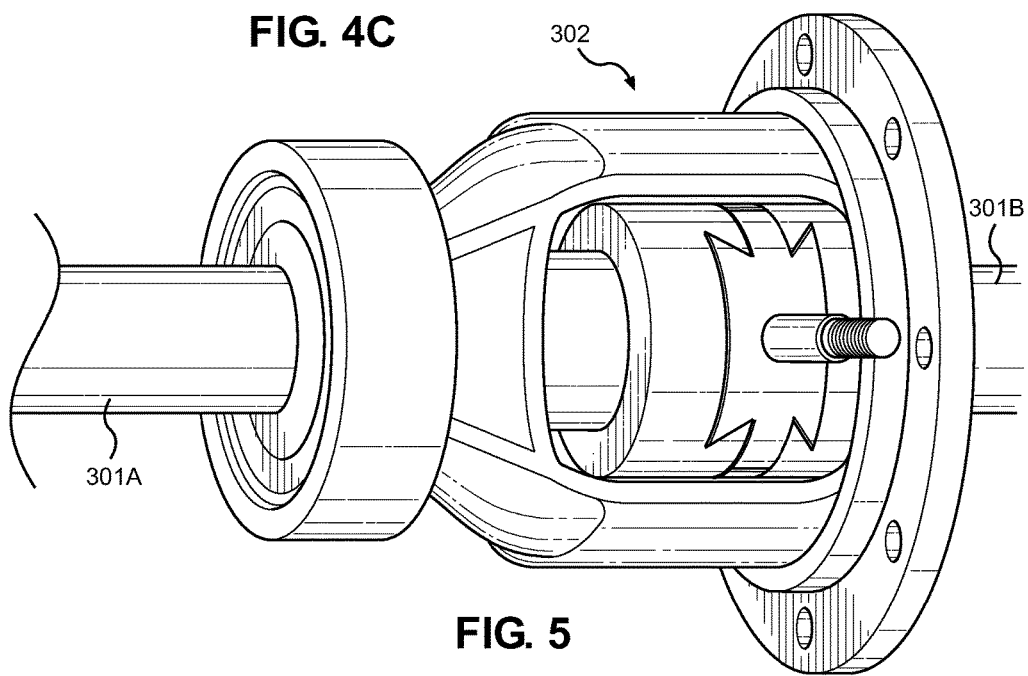
FIG. 5 shows a perspective view of the components of the present invention assembled within a carrier.

Referring now to FIG. 5, there is shown a perspective view of the components of the present invention assembled within a carrier. The present invention is installed by first removing the stock spider gears from the automobile's differential, while retaining the C-clips for the axles 301A, 301B and the locking pin or differential stud. Once the spider gears are removed, the user then places the outer drive flanges 101A, 101B into the carrier such that their necks 104 extend through the lateral ends of the carrier, sliding the rear axles 301A, 301B therethrough, and their interior surfaces 106 are facing the center of the carrier. The user then applies the stock C-clips to the ends of the axles, locking them against their respective outer drive flange 201A, 201B. Once the outer drive flanges 101A, 101B are secured to the proximal ends of the rear axles, the user then inserts the wedge locks 201A, 201B between the outer flange drives 101A, 101B. The outer flange drives 101A, 101B are adapted so that the space therebetween is equal to the cross-sectional area of the wedge locks 201A, 201B within a close tolerance, thereby ensuring proper fitment between the components. Once the wedge locks 201A, 201B are secured in place, the stock locking pin or differential stud is then inserted through the pin channel to secure the wedge locks 201A, 201B in place. The present assembly is adapted to replace the stock planetary or spider gears of a differential, thereby locking the axles in a co-rotational relationship. Such an arrangement reduces the occurrence of axle failure when drag racing.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A device, comprising:
a pair of outer drive flanges, each comprising a body, a channel extending through said body, a proximal surface, and a lateral surface;
said outer drive flanges adapted to engage with axles and be secured thereon via retainers;
a pair of wedge locks, each comprising an engagement surface adapted to engage with said proximal surface of said outer drive flanges and a channel extending therethrough;
said outer drive flanges and said wedge locks adapted to engage together to form an assembly;
said assembly adapted to fit within a differential carrier and lock said axles in a co-rotational relationship.

2. The device of claim 1, wherein:
said wedge lock engagement surfaces comprise splines extending therefrom;
said outer drive flange proximal surfaces comprise grooves adapted to engage said wedge lock splines.

3. The device of claim 1, wherein:
said outer drive flange proximal surface comprises splines extending therefrom;
said wedge lock engagement surface comprises grooves adapted to engage said outer drive flange splines.

4. The device of claim 1, wherein:
said outer drive flange lateral surface comprises a neck extending therefrom;
said neck adapted to engage an axle therethrough.

5. The device of claim 1, further comprising a cutout portion disposed on said wedge locks, said cutout portion adapted to form a contiguous channel with said outer drive flange channels.

\* \* \* \* \*